US008286618B2

(12) United States Patent
Michalske et al.

(10) Patent No.: US 8,286,618 B2
(45) Date of Patent: Oct. 16, 2012

(54) METHOD AND DEVICE FOR CONTROLLING AN INTERNAL COMBUSTION ENGINE

(75) Inventors: Andreas Michalske, Leonberg (DE); Thomas Zein, Sindelfingen (DE); Sascha-Juan Moran Auth, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 12/452,542

(22) PCT Filed: Jun. 10, 2008

(86) PCT No.: PCT/EP2008/057212
§ 371 (c)(1), (2), (4) Date: Mar. 10, 2010

(87) PCT Pub. No.: WO2009/010342
PCT Pub. Date: Jan. 22, 2009

(65) Prior Publication Data

US 2010/0162999 A1 Jul. 1, 2010

(30) Foreign Application Priority Data

Jul. 19, 2007 (DE) ........................ 10 2007 033 678

(51) Int. Cl.
*F02D 41/00* (2006.01)
*G01M 15/00* (2006.01)

(52) U.S. Cl. .................................... 123/676; 73/114.72

(58) Field of Classification Search .................. 123/478, 123/674, 676, 679, 693–695; 701/109; 73/114.72, 73/114.73
See application file for complete search history.

(56) References Cited

U.S. PATENT DOCUMENTS

| | | | | |
|---|---|---|---|---|
| 7,134,429 | B2 * | 11/2006 | Mader et al. | 123/703 |
| 2006/0130464 | A1 * | 6/2006 | Sun et al. | 60/295 |
| 2006/0207583 | A1 * | 9/2006 | Michalske et al. | 123/674 |

FOREIGN PATENT DOCUMENTS

| | | |
|---|---|---|
| DE | 43 44 137 | 6/1995 |
| DE | 10 316 185 | 11/2003 |
| EP | 0 627 548 | 12/1994 |
| EP | 0 890 724 | 1/1999 |
| JP | 11-93729 | 4/1999 |

OTHER PUBLICATIONS

Broeze, J. J.: "Combustion in piston engines" 1963, De Technische Uitgeverij, Haarlem. pp. 86-87.
Memento de technologie automobile, 1re Ed. 1988, Bosch Robert GMBH, Stuttgart, XP002130730.

* cited by examiner

*Primary Examiner* — Stephen K Cronin
*Assistant Examiner* — Sherman Manley
(74) *Attorney, Agent, or Firm* — Kenyon & Kenyon LLP

(57) ABSTRACT

A device and a method for controlling an internal combustion engine are provided, in which the fuel quantity to be injected is controlled as a function of a Lambda signal. A setpoint value for the Lambda signal is specified on the basis of at least one maximally permitted exhaust-gas temperature value.

4 Claims, 1 Drawing Sheet

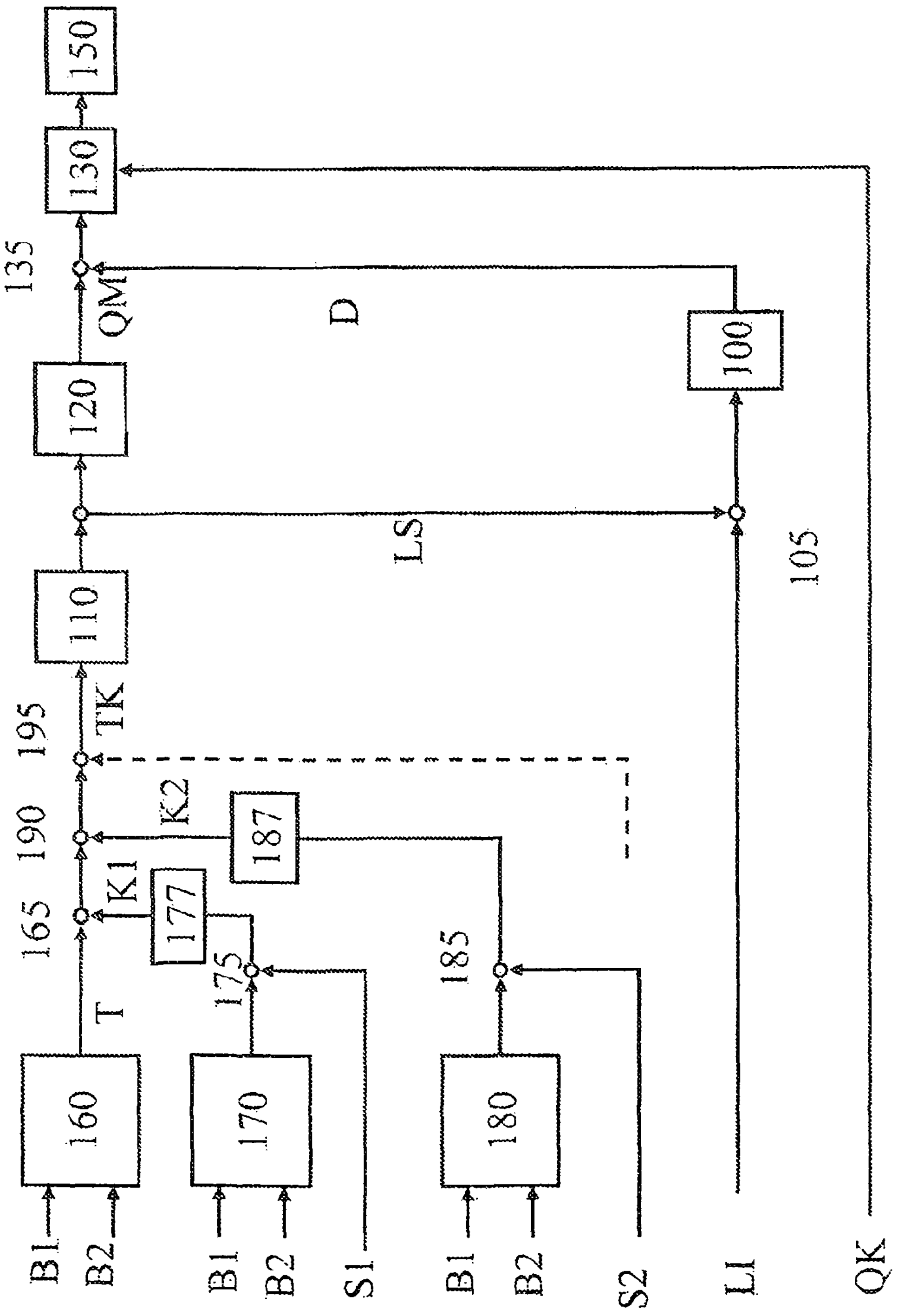
150
130
120
110
100
160
170
180
177
187
135
195
190
165
175
185
105
QM
D
LS
TK
K1
K2
T
B1
B2
S1
S2
LI
QK

METHOD AND DEVICE FOR CONTROLLING AN INTERNAL COMBUSTION ENGINE

BACKGROUND OF THE INVENTION

1. Field of the Invention

The present invention relates to a method and a device for controlling an internal combustion engine.

2. Description of Related Art

A method and a device for controlling an internal combustion engine in which the fuel quantity to be injected is influenced as a function of a Lambda signal is already known from published German patent document published German patent document DE 103 161 85. In the process, a value for restricting the fuel quantity to be injected is specified or appropriately corrected as a function of a closed-loop control, which sets the actual value of the Lambda signal to a setpoint value.

This is a functionality for a Lambda closed-loop control in full loading based on the measured Lambda signal in the exhaust tract. Temperature variations caused by drifts over the service life of the vehicle are able to be reduced by such a close-loop control. To this end, a Lambda setpoint value is specified, which is adapted to the thermal loading capacity of the internal combustion engine and to the worst imaginable ambient conditions. The Lambda setpoint value is determined from a characteristics map as a function of the rotational speed and the air mass. One disadvantage of such an approach is that the setpoint formation does not take all the influences on the exhaust-gas temperature into account and thus is imprecise. The unconsidered influences must be covered by providing appropriate safety data in the software. Because of this safety data provision, the power potential of the internal combustion engine is not utilized to the full since a certain buffer with respect to the actual loading limit must be held in reserve in the system configuration.

Furthermore, methods and approaches are known in which the exhaust-gas temperature in the exhaust-gas tract is measured by a temperature sensor and regulated to a specifiable setpoint value. The disadvantage of such an approach is that sensors of this type have poor dynamics. In addition, such sensors are complex and thus expensive. Because of the poor dynamics, insufficient control quality results during dynamic driving situations.

The related art provides two variants for the system configurations in the application of the system. For instance, the data may be applied such that the maximum output of the system is utilized. This in disadvantageous inasmuch as there is an increased risk of component damage under extreme marginal conditions, for instance at high ambient temperatures or with drifts of components. These are caused by an increased exhaust-gas temperature, in particular. On the other hand, the system and an application may be configured such that none of these impermissible exhaust-gas temperatures will ever occur under any circumstances. This in turn means that the performance potential of the internal combustion engine is not utilized to the fullest.

BRIEF SUMMARY OF THE INVENTION

According to the present invention, the setpoint value for the Lambda signal is specified on the basis of at least one exhaust-gas temperature value. According to the present invention it was recognized that the specification of a setpoint value for the Lambda signal can implicitly influence the exhaust-gas temperature. Any factors influencing the Lambda signal likewise influence the resulting exhaust-gas temperature. In addition, there are other influencing factors that affect only the exhaust-gas temperature but not the Lambda signal. The influence of both types of disturbance factors on the exhaust-gas temperature is able to be compensated by correcting the Lambda setpoint value. When setting the Lambda setpoint value via appropriate system interventions, for example by controlling the injected fuel quantity, the exhaust-gas temperature is able to be kept within a very narrow tolerance band. Furthermore, the sensor-supported Lambda closed-loop control offers the advantage that this still applies even after a long service life of the vehicle.

It is especially advantageous if a basic value for the exhaust-gas temperature value is input on the basis of an operating point that is currently active. The operating point is preferably defined by the load and the rotational speed of the internal combustion engine.

In a further advantageous development, the basic value is corrected as a function of the deviation of instantaneous variables from a reference value. That is to say, the basic value for the exhaust-gas temperature is normally determined at reference values of different disturbance variables that affect the exhaust-gas temperature. If the disturbance variables deviate from the reference values, then their influence on the exhaust-gas temperature is taken into account thereby, and a corresponding correction value is formed. This correction value is used to adapt the associated Lambda setpoint value.

Taken into account as disturbance variables is at least one of the variables of exhaust-gas back pressure, temperature and/or the injection pattern. In particular the engine temperature and/or the intake air temperature are to be taken into account as temperature. The number of partial injections and the injection start, in particular, are taken into account as injection pattern. It is especially advantageous if the different corrections are performed both additively and multiplicatively.

In a further development, the measured Lambda value is compared with the setpoint value for the Lambda value determined in this manner, and the fuel quantity to be injected is specified on the basis of this comparison. For one, it may be provided to determine the fuel quantity directly by the output signal of the closed-loop controller; for another, it may be provided that the Lambda closed-loop control specifies the maximally permitted value for the fuel quantity to be injected, in the sense of a restriction.

According to the present invention, this means that a combination of a disturbance-variable feed-forward and a Lambda closed-loop control is implemented on the basis of the measured oxygen concentration in the exhaust gas. In so doing, a system configuration takes place under reference condition in order to utilize the maximum output potential. Furthermore, the deviations with regard to the reference conditions are detected and the setpoint values corrected accordingly. This results in high robustness even under other marginal conditions. In addition, the instantaneous setpoint value determined in this manner is set in a highly precise manner by the Lambda closed-loop control. This is true even if drift occurs in the components of the air system and/or in the injection system over the service life of the internal combustion engine or the vehicle.

BRIEF DESCRIPTION OF THE DRAWING

FIG. 1 shows a block diagram illustrating an example method of the present invention.

DETAILED DESCRIPTION

In the following text, the method is described using the fuel quantity as example. The method may also be used with other variables that characterize the fuel quantity, in particular the torque in an internal combustion engine having direct injection, and/or the control period of a quantity-defining actuating element.

FIG. 1 shows the essential elements of the method according to the present invention in the form of a block diagram. Reference numeral 100 denotes a Lambda closed-loop control. It is provided with the output signal of a node 105 to whose inputs the output signal of a first converter 110 is applied, and to whose second input actual value LI of the Lambda signal is applied.

In the following text, the method is described using the Lambda signal as example. The method is not restricted to a Lambda signal, but can also be used for other signals that indicate a variable characterizing the residual oxygen concentration in the exhaust gas. In particular, it is possible to use the oxygen content as Lambda signal. Furthermore, the reciprocal Lambda value may be used as well. These variables are referred to as Lambda signal hereinafter.

Based on the deviation between these two signals, Lambda closed-loop control 100 provides a signal D to a node 135. Output signal QM of second converter 120 is applied at the second input of node 135. The output signal of node 135 is applied to a minimum selection 130, at whose second input a signal with regard to fuel quantity Qk to be injected is applied in turn. Minimum selection 130 controls an actuator 150 as a function of the comparison of the two signals. This actuator 150 meters the desired fuel quantity to the internal combustion engine.

The output signal of first converter 110 reaches second converter 120. A basic value input is denoted by 160 and supplies a basic value T of the exhaust-gas temperature. This value arrives at node 165. Different signals 131 and 132, which characterize the operating state of the internal combustion engine, are forwarded to basic value input 160. The output signal from a first correction input 177, to which the output signal of node 175 is applied, is available at the second input of node 165. At the first input of node 175, the output of a first reference value input 170 is applied, to which the variables B1 and B2, which characterize the operating point of the internal combustion engine, are in turn applied. A first measured variable of a first disturbance variable S1 is applied at the second input of node 175.

The output signal from a second correction input 187, to which the output signal of node 185 is applied, is available at the second input of node 190. Applied at the first input of node 185 is the output signal from a second reference value input 180, to which the variables B1 and B2, which characterize the operating point of the internal combustion engine, are in turn applied. A second measured variable of a second disturbance variable S2 is applied at the second input of node 185.

The dashed line indicates that still further disturbance variables may be taken into account apart from disturbance variables S1 and S2.

Via node 190 and possibly via node 195, the output signal of node 165 arrives at first converter 110 as input variable TK.

Apart from the illustrated input signals, the various blocks are able to process additional input signals.

The maximally permitted exhaust-gas temperature T is stored in basic value input 160 as a function of the operating point of the internal combustion engine. This value applies to the operating points under specified marginal conditions, i.e., under specific reference conditions. The operating point of the internal combustion engine is essentially defined by the load and the rotational speed of the internal combustion engine. In addition to these variables, other variables may be utilized for defining the operating point. If deviations from the reference conditions occur, then the value for exhaust-gas temperature T determined in this manner is adjusted via disturbance-variable feed-forward.

The disturbance variables are taken into account by comparing the instantaneous marginal conditions with the reference conditions. The effects on the exhaust-gas temperature of the deviations from the reference conditions are detected during the application and stored in correction input 177 or 187 as characteristics curve. Depending on the type and effect of the control variable, an additive or a multiplicative correction takes place in nodes 165, 190 and 195.

The effect of the particular marginal condition is stored in reference-value input 170 or 180. For instance, the influence of the aspirated air temperature on the exhaust-gas temperature is stored as a function of the operating point. This stored value corresponds to the value of the aspirated air temperature under reference conditions. The actual value for aspirated air temperature S1 is measured and compared with the operating-point-dependent reference value in node 175. If there is a deviation between the two values, then first correction input 177 outputs a corresponding correction value in order to correct the exhaust-gas temperature.

This means that basic value T of the exhaust-gas temperature is corrected as a function of the deviation of instantaneous disturbance variables from a reference value of the disturbance variable. At least one of the variables of exhaust-gas back pressure, temperature or an injection pattern is taken into account as disturbance variable. The temperature of the aspirated air or the engine temperature is preferably taken into account as temperature variable. A correction, such in the direction of an increased temperature takes place if the aspirated air temperature or the engine temperature lies above the reference temperature. Which partial injections are implemented is taken into account as injection pattern.

In the specific example embodiment shown, two corrections are illustrated with two marginal conditions. Other corrections may be provided in addition. This is indicated by the dashed line on node 195.

Exhaust-gas temperature value TK corrected in this manner is converted into a Lambda setpoint value in first converter 110. In one especially advantageous development, additional variables characterizing the engine operating point may be taken into account in the conversion. In this context it may be provided that a conversion takes place; as an alternative to the conversion, a corresponding characteristics curve or a corresponding, multi-dimensional characteristics map also may be stored.

Lambda setpoint value LS determined in this manner is used as setpoint value for Lambda closed-loop control. In addition, the Lambda value may be utilized to determine the precontrol quantity. That is to say, second converter 120 calculates the maximally permitted fuel quantity QM to be injected on the basis of Lambda value LS, taking the air mass into account.

This quantity is corrected with the aid of output signal D of Lambda closed-loop control 100. Then, the highest permitted quantitative value thus corrected is applied to minimum-value selection 130. The correspondingly restricted fuel quantity to be injected is then used to control actuator 150.

In other words, a maximum value is specified for the fuel quantity to be injected based on a measured Lambda value and the setpoint value for the Lambda signal.

In one development of the present invention, converter 110 may also be placed between basic value input 160 and node 165. This means that correction inputs 177 and 187 do not supply a temperature signal but a Lambda signal.

Apart from the illustrated input signals, the various blocks are able to process additional input signals.

What is claimed is:

1. A method for controlling an internal combustion engine, comprising:

specifying a setpoint value for a Lambda signal by:

(i) specifying an initial value of a maximally permitted exhaust-gas temperature value on the basis of an operating point of the internal combustion engine;

(ii) correcting the initial value of the maximally permitted exhaust-gas temperature as a function of a deviation between a reference value of at least one disturbance variable and an instantaneous value of the at least one disturbance variable; and (iii) converting the corrected value of the maximally permitted exhaust-gas temperature into the setpoint value for the Lambda signal; and controlling a fuel-injection quantity as a function of the setpoint value for the Lambda signal.

2. The method as recited in claim 1, wherein one of exhaust-gas back pressure, temperature or an injection pattern is taken into account as the disturbance variable.

3. The method as recited in claim 1, wherein the fuel-injection quantity is set on the basis of a measured Lambda value and the setpoint value for the Lambda signal.

4. The method as recited in claim 1, wherein a maximum value for the fuel-injection quantity is specified based on a measured Lambda value and the setpoint value for the Lambda signal.

* * * * *